June 8, 1954  H. G. KAMRATH  2,680,521
FILTER ELEMENT FOR CASINGS HAVING INSIDE-OUT FLOW
Filed March 29, 1951
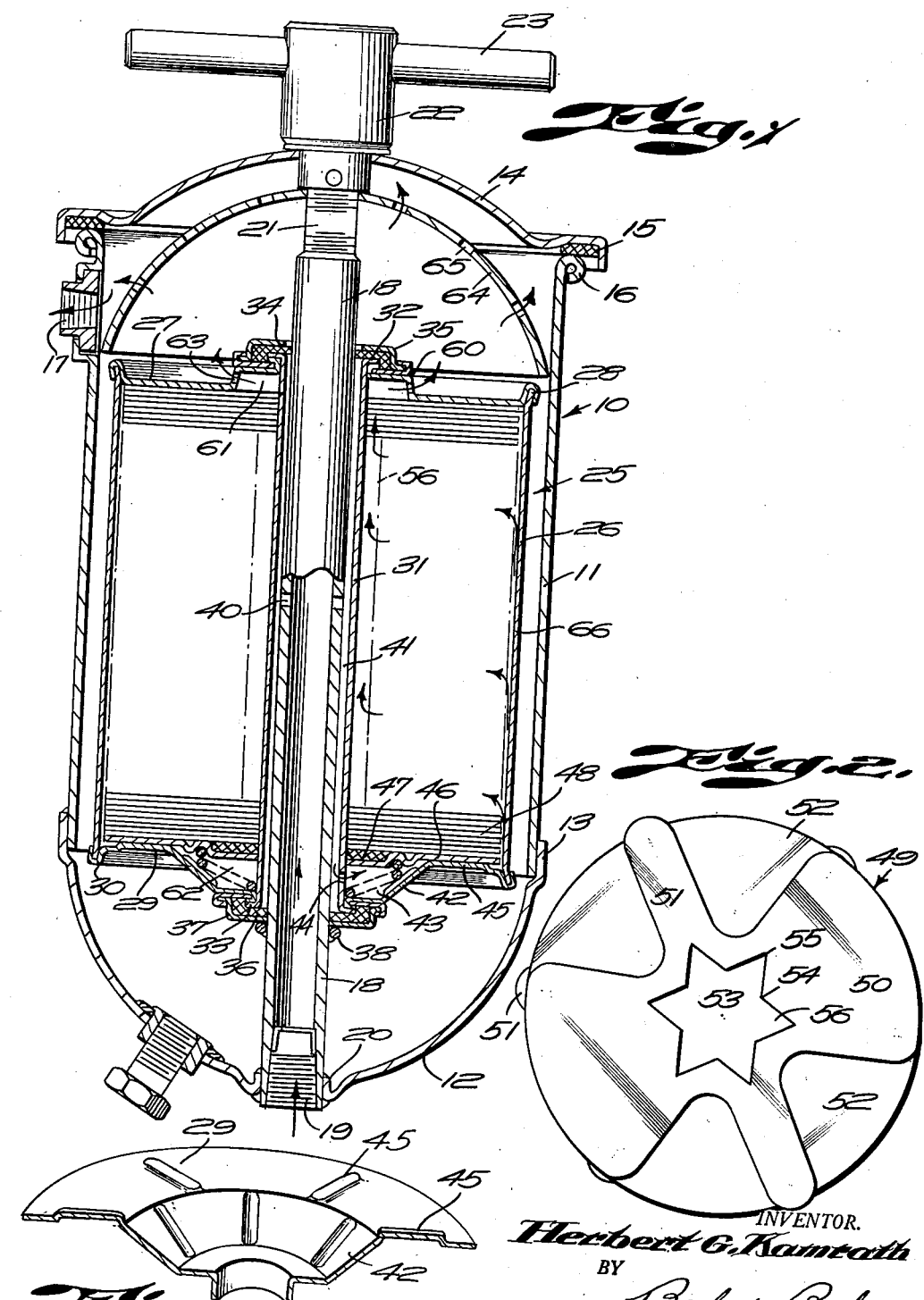
INVENTOR.
Herbert G. Kamrath
BY
Barlow & Barlow
Attorneys Patented June 8, 1954

2,680,521

UNITED STATES PATENT OFFICE 2,680,521

FILTER ELEMENT FOR CASINGS HAVING INSIDE-OUT FLOW

Herbert G. Kamrath, Barrington, R. I., assignor to Fram Corporation, a corporation of Rhode Island Application March 29, 1951, Serial No. 218,190

4 Claims. (Cl. 210—183)

This invention relates to a filter for removing contaminant from a liquid and is of a type used for the filtration of lubricating oil and the like.

It is usual in this type of filtration to provide a casing in which the liquid to be filtered is passed into the shell of the casing and is withdrawn from a center tube extending lengthwise axially of the casing. In some instances, however, it is found that the oil enters the center tube of the casing and leaves through the side wall of the casing and a different filter element cartridge must be used.

One of the objects of this invention is to provide such a cartridge which may be utilized where the liquid enters the center tube but which will operate in outside-in flow relation.

Another object of the invention is to provide the cartridge of such construction that it may be of the same general form and appearance as the usual cartridge although having different internal arrangements.

With these and other objects in view, the invention consists of certain novel features of construction as will be more fully described and particularly pointed out in the appended claims.

In the accompanying drawings:

Fig. 1 is a sectional view through a filter constructed in accordance with this invention;

Fig. 2 is a top plan view of a group of discs of filter material which are utilized within the shell of the filter element cartridge;

Fig. 3 is a perspective view of a fragmental portion of the bottom wall of the filter element cartridge, showing the ribbed construction thereof.

In proceeding with this invention I provide a filter element with a tubular core which may receive the center tube and which has the filter material in a shell with conduits arranged in the shell for the outside-in passage of liquid through the filter material and thence out of the shell into the casing so that the liquid may be received in the center tube of the casing and pass out of the side wall of the casing.

With reference to the drawings, 10 designates generally a filter casing having a cylindrical side wall 11, a cup-like bottom wall 12 welded thereto as at 13, and a removable cover 14 which seals through a gasket 15 with a rolled edge 16 of the side wall 11. A discharge opening 17 is provided in the side wall 11 through which liquid may leave the casing.

A center tube 18 extends axially through the casing and communicates with the outside of the casing, providing an inlet opening 19. The center tube is rigidly attached to the bottom wall by means of welding as at 20. The upper end of the center tube is threaded as at 21 and receives a nut 22 having a handle 23 for holding the cover 14 in position on the casing. Within this casing, I provide a filter element cartridge which is removable from the casing when the cover is taken off. The shell is designated 25 and comprises a cylindrical side wall 26 and an end wall 27 at one end rolled into sealed engagement with the side wall 25 as at 28 and a bottom wall 29 rolled into sealed engagement with the side wall 26 as at 30.

A tubular core 31 extends axially through this shell 25 and is concentric with the cylindrical side wall 26. It passes through the end walls and is secured thereto by its ends being rolled over the end wall as at 32 and 33. A soft washer 34 is held on the end wall 27 by a cap 35 so that this soft washer will provide a seal with the center tube 18 at the upper end while at the lower end a soft washer 36 is held in position on the end wall by a cap 37 so that it will engage the center tube 18 and provide a seal therewith. This cap 37 rests upon abutments 38 projecting from the center tube so as to support the cartridge axially and position it in the casing as shown in Fig. 1 of the drawings.

The center tube 18 between the seals 34 and 36 is provided with lateral openings 40 so that the fluid entering the center tube at 19 may pass from the center tube into the annular chamber 41 between the center tube and the center core 31.

The bottom wall 29 is drawn downwardly as shown in Figs. 1 and 3 to provide a cup 42 which forms a pocket 43 between this cup and the tubular core while there are openings 44 through the tubular core at the location of this pocket for entrance of the liquid to be filtered from the annular chamber 41.

Ribs 45 are formed in the end wall 29 and while serving to stiffen the end wall also provide rests for a plate 46 which is sealed by a soft gasket 47 on the tubular core 31 but these ribs provide a channel beneath the plate to the outer cylindrical wall 26. Upon the plate there is located the filter material 48, which comprises a pulrality of lobular discs 49 shaped as shown in Fig. 2 with lobes 50 and spokes 51. Spokes 51 are of a greater radius than the lobes 50 so that a spoke 51 extends beyond the lobes when the discs are stacked one on the other and each oriented through 60° or a multiple thereof. Thus there is provided contaminant collecting cells 52 between the spokes and the lobes so that liquid may enter these cells, pass through the spokes or lobes in the shortest path of travel to the center opening 53 leaving the contaminant deposited in the cells. The opening 53 is in the shape of a six-pointed star with the portions closest to the axial center 54 contacting with the tubular core 31 while the points 55 provide spaces or the filtrate discharge conduits along the outer surface of the core axially thereof. These conduits of course are closed by the seal 47 at the lower end so that the pocket 43 will not communicate with these filtrate conduits.

The upper end wall 27 is drawn to provide an upwardly extending portion 60 which forms a pocket 61 with the tubular core 31 and communicates with the filtrate conduit such as 56 along the filter material. In order that the discs will seal with the smooth under surface of the top wall 27, these discs engage this top wall and are forced upwardly by a spring 62 located in the pocket 43 and forcing the disc upwardly, which also serves to keep the discs in firm contact with each other and to permit of some expansion or contraction of these discs, always maintaining them in proper pressure relation one to the other while also maintaining a seal for the pocket 61.

There is an opening 63 from the pocket 61 to the outer side of the shell so that filtrate liquid may pass therefrom into the space about the shell and beneath the half spherical hood 64 having openings 65 therein and thence out of the casing through the discharge opening 17.

It will be apparent that the liquid may enter at 19 as shown by the arrows, pass through opening 40 into the annular chamber 41, thence through opening 44 into the pocket 43 beneath the plate 46 to the outer annular space 66 between the filter material and the wall 26 of the shell, thence through the filter material into the filtrate conduit 56, thence to the pocket 61 out through opening 63 into the space in the casing about the shell and thence out of the casing as at 17. Thus, the flow to the filtrate material is from outside to inside while the flow in the casing appears to be from inside to outside. The cartridge may be easily removed by removing the cover 14, taking out the shell or cartridge 26 and replacing it with another.

I claim:

1. A filter cartridge for use in a casing having a discharge opening in its side wall, and a center tube forming an inlet at one end of the casing and extending lengthwise through the center of the casing and having a discharge hole in its wall, said cartridge comprising a shell with side and end walls and an axially extending core that is secured to said end walls with a tight joint and loosely surrounds said tube with tight sealing said end walls about the tube with tight joints, filtering material in said shell spaced from the side wall of the shell and from the core sufficiently to provide a liquid passage therebetween, and means providing a passage from adjacent one end of the core to the space between the filter element and said side wall and from the space between the core and filter element to the area within the casing, whereby an outside-in filtering action is secured and the liquid is filtered before it contacts the casing walls.

2. A filter comprising a casing having a discharge opening along a wall thereof, a center tube communicating with the outside of the casing for entrance thereto and extending lengthwise through the center of the casing, a removable filter element comprising a shell with side and end walls with an axially extending tubular core opening through the end walls and through which the center tube extends and serves as the sole means to support said element, means to seal the end walls with the center tube to provide an annular chamber, said center tube having an inlet opening into said chamber, filtering material in said shell shaped to provide a filtrate conduit along the outer surface of said core and spaced from the side wall, said end walls being cupped to provide pockets, one of said pockets being sealed from the filtering material and provided with an opening to said annular chamber and a conduit to the space between said filter element and the side wall and the other pocket communicating with said filtrate conduit and having an opening to the outside of the shell for passage of the filtrate into the casing and thence to the discharge opening.

3. A filter as in claim 2 wherein the filter material is urged toward one end wall by a spring acting between the other end wall and the filter material.

4. A filter as in claim 2 wherein the filter material is urged toward one end wall having the pocket communicating with the outside of the shell by a spring located in the opposite pocket.

References Cited in the file of this patent

UNITED STATES PATENTS

| Number | Name | Date |
|---|---|---|
| 516,140 | Weir | Mar. 6, 1894 |
| 1,844,611 | Spackman | Feb. 9, 1932 |
| 2,067,439 | Dooley | Jan. 12, 1937 |
| 2,247,445 | Long | July 1, 1941 |
| 2,429,321 | La Brecque | Oct. 21, 1947 |
| 2,473,727 | Robertson | June 21, 1949 |
| 2,522,502 | Clark | Sept. 19, 1950 |
| 2,522,975 | Voorhees | Sept. 19, 1950 |
| 2,548,584 | Briggs | Apr. 10, 1951 |
| 2,564,637 | Chase | Aug. 14, 1951 |

FOREIGN PATENTS

| Number | Country | Date |
|---|---|---|
| 198,700 | Switzerland | July 15, 1938 |